May 10, 1960 D. H. POLZIN 2,935,897
VARIABLE DRIVE MECHANISM
Filed Sept. 8, 1958 3 Sheets-Sheet 1

INVENTOR.
DONALD H. POLZIN
BY
ATTORNEYS

May 10, 1960 D. H. POLZIN 2,935,897
VARIABLE DRIVE MECHANISM
Filed Sept. 8, 1958 3 Sheets-Sheet 2
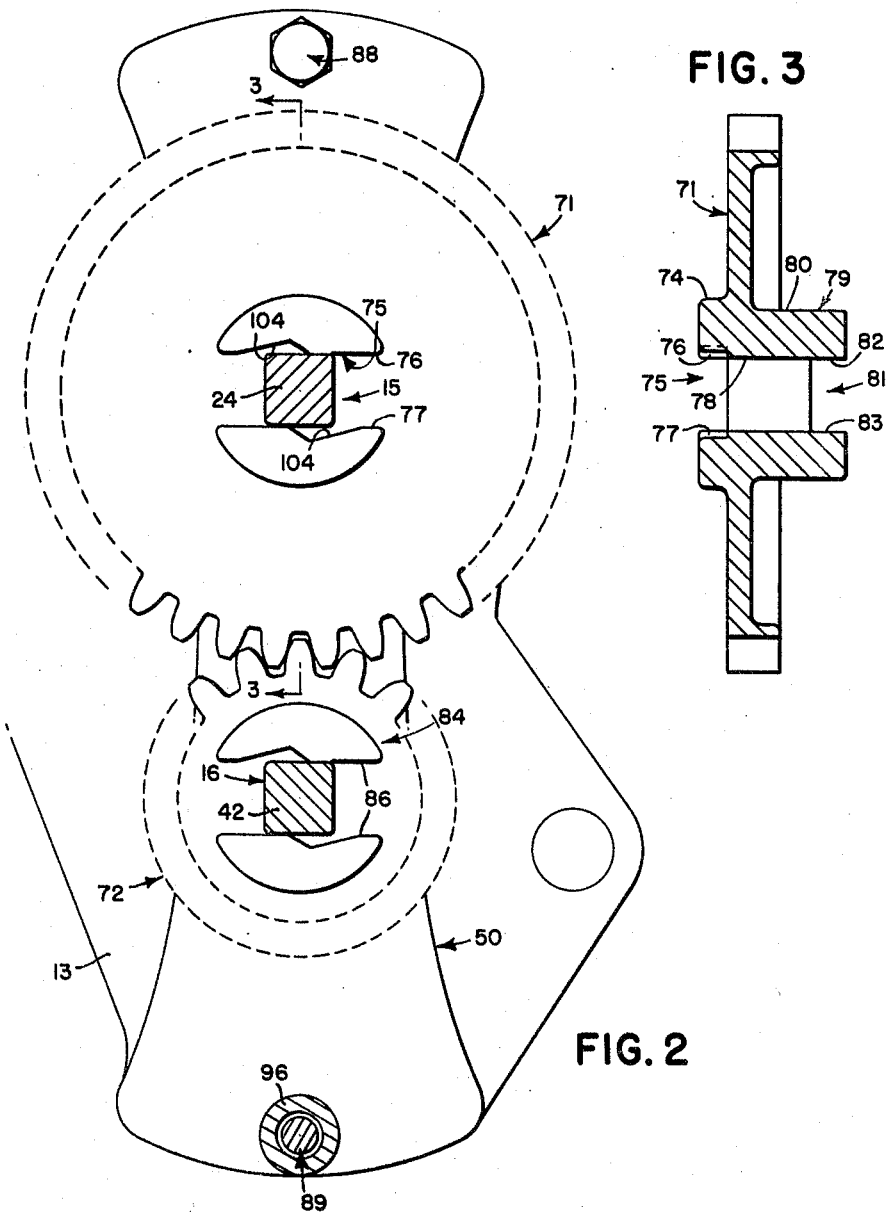
*INVENTOR.*
DONALD H. POLZIN
ATTORNEYS May 10, 1960  D. H. POLZIN  2,935,897
VARIABLE DRIVE MECHANISM Filed Sept. 8, 1958  3 Sheets-Sheet 3

INVENTOR.
DONALD H. POLZIN
BY
*Parker & Johnson*
ATTORNEYS

United States Patent Office 2,935,897
Patented May 10, 1960

2,935,897

VARIABLE DRIVE MECHANISM

Donald H. Polzin, Horicon, Wis., assignor to Deere & Company, Moline, Ill., a corporation of Delaware Application September 8, 1958, Serial No. 759,553

14 Claims. (Cl. 74—665)

The present invention relates generally to agricultural implements and more particularly to fertilizer and/or seed dispensing machines.

The objects and general nature of this invention is a provision of new and improved means for securing a variable drive for the dispensing mechanism, so constructed and arranged as to be disposable within a relatively small space yet provide for easy and convenient drive ratio changes when desired.

More specifically, it is a feature of this invention to provide a variable drive mechanism for a fertilizer distributing apparatus in which the latter includes two units disposed in close adjacency, with the drive mechanism disposed between the units, generally in the central portion of the implement, thus leaving the outer ends of the implement free of obstructions or/and the like. A further feature of this invention is the provision of a gear support and a pair of interchangeable gears carried thereby, with means providing for easy removal from and attachment to the associated shaft means, whereby changing the drive ratio when desired may be effected easily and conveniently.

These and other objects and advantages of this invention will be apparent to those skilled in the art after a consideration of the following detailed description, taken in conjunction with the accompanying drawings in which:

Fig. 2 is a sectional view taken along the lines 2—2 of Fig. 1.

Fig. 3 is a section taken along the line 3—3 of Fig. 2, through one of the gears shown in Fig. 1.

Figure 1:
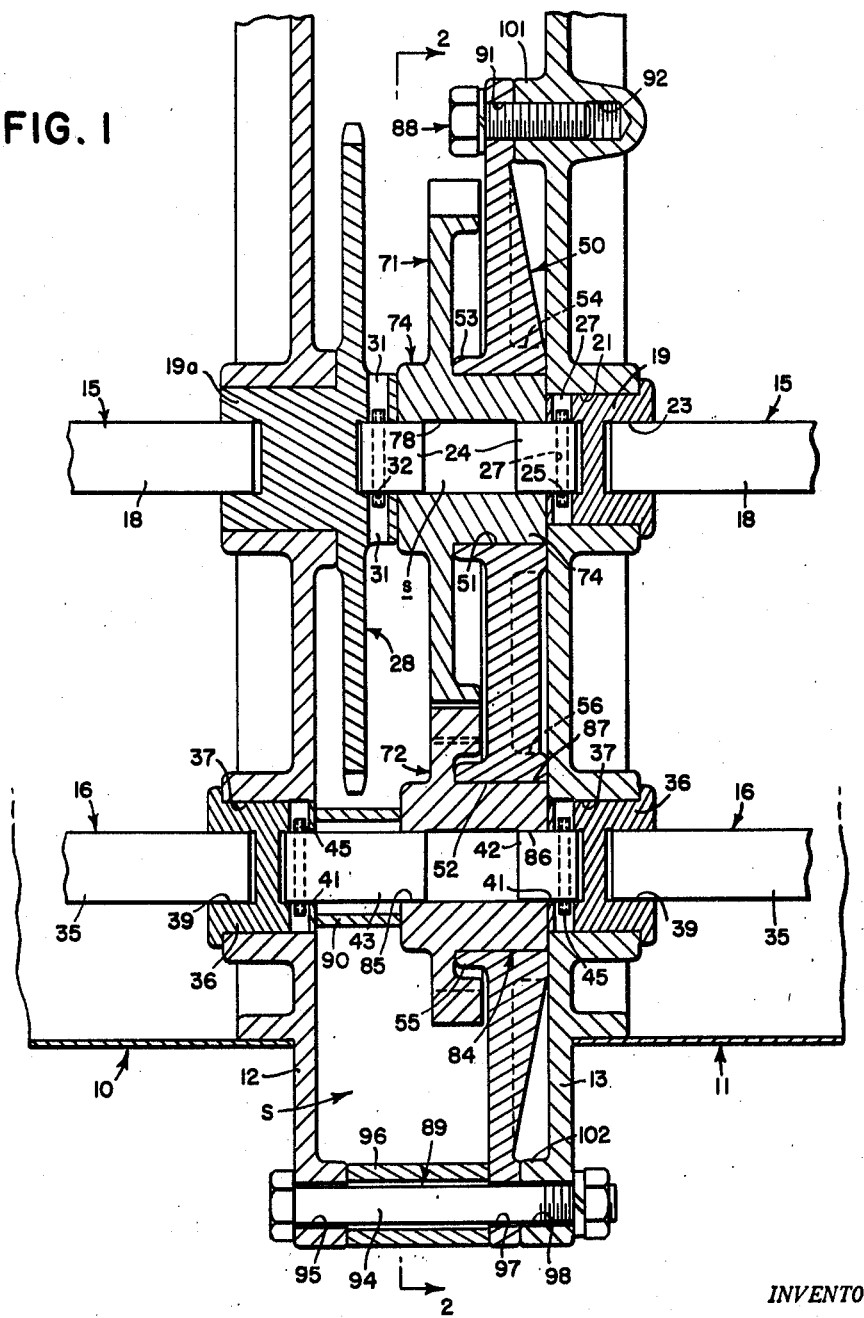
Fig. 1 is a generally vertical section taken centrally through the adjacently mounted portions and looking rearwardly of a dual hopper type of fertilizer distributor in which the principles of the present invention have been incorporated.

Referring first to Fig. 1, the principles of the present invention have been shown by way of illustration as incorporated in a fertilizer distributor having two end to end mounted hopper units 10 and 11 arranged with the inner end members 12 and 13 arranged in relatively closely spaced apart relation, the space therebetween being indicated by the reference character S. Disposed in the generally upper portions of the hoppers 10 and 11 is a pair of axially aligned agitator shaft means, each indicated by the reference numeral 15, and disposed in the lower portions of the hoppers 10 and 11 is a pair of feed shaft means indicated generally by the reference numeral 16. The upper or agitator shaft means 15 includes a main shaft section 18 supported at its laterally inner end in a bushing 19 that is rotatably disposed in a bearing opening 21 formed in the associated end member 13. The bushing 19 is provided with a central opening 23 in one end of which the adjacent shaft section 18 is disposed. The other end of the bushing 19 receives a short section 24 that is held in position in the bushing 19 by means of a pin 25 extended through an opening 26 in the shaft section 24 and into an associated opening 27 formed in the inner end of the bushing 19. Preferably, the agitator shaft section 18 is square in cross section, and likewise the opening 23 and the shaft section 24 are square, whereby the several parts turn together and the short shaft section 24, together with the bushing 19, serves as the laterally inner end portion of the agitator shaft means 15. Associated with the other agitator shaft means 15, and axially aligned therewith is a bushing 19a that is substantially of the same construction as the bushing 19, except that the bushing 19a serves as the hub of a drive gear 28, the drive gear hub including openings 31 through which a pin 32 may be inserted into an opening in an associated short shaft section 24. These end sections 24, as will be clear from Fig. 1, are arranged in axially spaced apart relation with a space $s$ therebetween.

The lower or feed shaft means 16 is constructed substantially like the shaft means described above. Specifically, the lower feed shaft means includes hopper carried feed shaft sections 35, the inner end portions of which are carried by supporting bushings 36 disposed for rotation in bearing openings 37 formed in the hopper end members 12 and 13. The bushings 36 are provided with square sockets 39, to receive the associated shaft sections 35, and also with square shaft-receiving sockets 41 to receive short shaft sections 42 and 43, the latter section being somewhat longer than the section 42. The shaft sections 42 and 43 are held in place by detachable pins 45, which may be of the same construction as the pins 32 described above. Also, the shaft sections 18 and 24, described above, and the bushing sockets receiving them, are also square in cross section.

Figure 4:
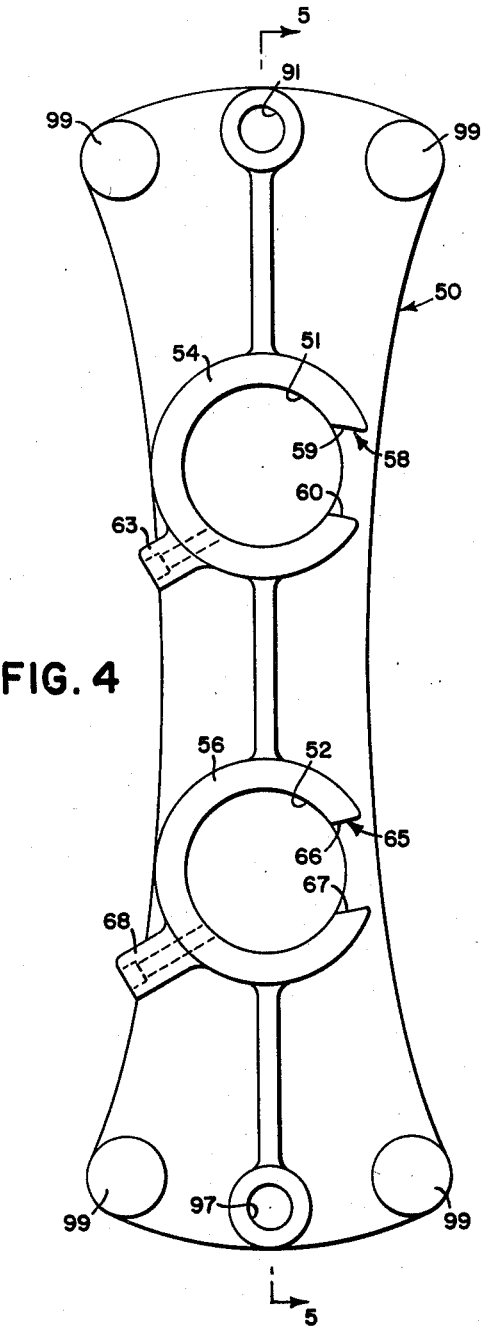
Fig. 4 is an elevation of the removable gear support bracket.
Figure 5:
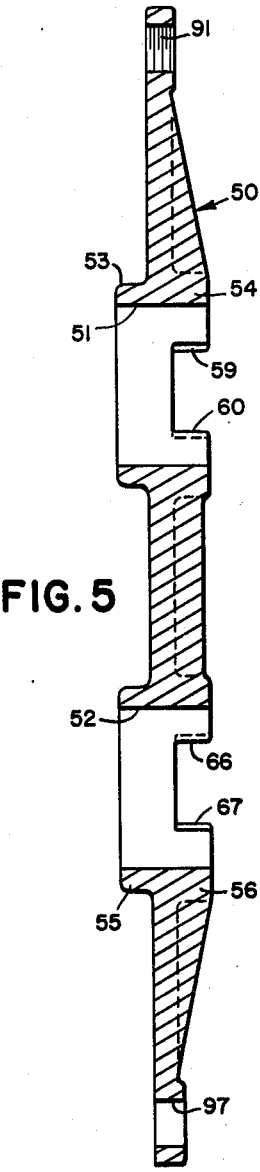
Fig. 5 is a section taken generally along the line 5—5 of Fig. 4.

A gear support or carrier 50, best shown in Figs. 4 and 5, is removably disposed between the hopper end members 12 and 13. The gear support 50 comprises an elongated casting having a pair of shaft receiving openings 51 and 52. The opening 51 is surrounded by laterally extending flanges 53 and 54, and flanges 55 and 56 are disposed about the opening 52, at opposite sides of the member 50. The flange 54 is provided with a notch 58 that extends generally transversely of the member 50, the walls 59 and 60 of the notch being formed so as to lie on a radius extending from the axis of the other opening 52 as the center. The generally perpendicular distance between the notch walls, is slightly greater than the diameter of the associated shaft section 24, for the purpose which will be described below. A tapped boss 63 is formed in the member 50 and has an opening that extends into the bearing opening 51, the boss 63 serving to receive a lubricant fitting (not shown).

The flange 56 about the opening 52 is also notched at 65 and the walls 66 and 67 thereof are formed to lie in circles having the axis of the other opening 51 as a center. The walls 66 and 67 are spaced apart so as to pass over the shaft section 42. The flange 56 also has a boss 68 to receive a lubricant fitting.

The support 50 is adapted to carry a pair of interchangeable gears 71 and 72. In one form of this invention, the gears 71 has 33 teeth and the gear 72 has 18 teeth, but this may vary. The gear 71 has a hub portion 74 at one side of the gear 71 which is formed with a notch 75 extending across the diameter of the hub portion. The walls 76 and 77 of the notch 75 are spaced apart the same distance as the walls 59, 60 and 66, 67, and the opening 78 in the gear is square in cross section, corresponding dimensionally to the shaft means 15 and 16. At the other side of the gear 71, the hub section 79 is somewhat longer and has an outer cylindrical chilled surface 80 which has bearing support in the associated gear carrier opening 51. The end portion of the hub 80 is notched, as at 81, the walls 82 and 83 of which is spaced apart the same distance as the distance between the opposite notch walls 76 and 77, the two notched portions being generally parallel, as best shown in Fig. 3. The other gear 72 has substantially the same configuration as the gear 71, having a hub section 84 at the opposite ends of which, at both side of the main body of the gear, are notches 85 and 86 that are parallel. The longer hub portion has an exterior cylindrical chilled surface 87 and adapted to receive bearing support in the associated gate carrier opening 52. A spacer 90 embraces shaft section 43 and lies between the bushing 36 and gear 72.

The gear carrier 50 is removably fixed in position between the end pieces 12 and 13 by upper and lower fasteners 88 and 89. The upper fastener 88 comprises a cap screw extending through an opening 91 in the upper portion of the carrier 50 and into a tapped recess 92 formed in the hopper end member 13. The lower fastener 89 comprises a bolt 94 extending through an opening 95 in the lower portion of the hopper end member 12, through a bushing 96 disposed between the lower portions of the end members 12 and 13, through an opening 97 in the lower portion of the carrier 50, and through an opening 98 in the lower portion of the hopper end member 13. As best shown in Fig. 4, the carrier casting 50 is provided with upper and lower locating pads 99 that, when the carrier is attached in position between the end members 12 and 13, engage adjacent portions 101 and 102 of the hopper end member 13 so as to secure accurate positioning of the carrier 50.

In operation, assuming that the parts are arranged as shown in Fig. 1, the drive gear 28 is driven by suitable means, not shown, and rotation of the gear 28 serves to drive both agitator sections 18, one being driven directly from the bushing section 19a of the gear 28 and the other agitator shaft section being driven by virtue of the drive correction afforded by the hub section 74 of the gear 71 and the non-rotatable connection therewith provided by the short shaft sections 24. These sections 24, as will be clear from Fig. 1, serve as inner end portions of the two agitator shafts 15. The gear 71 is rotated with the agitator shafts 18 and, meshing with the lower or smaller gear 72, drives the latter at an increased rate, as compared with the rate of rotation of the agitator shaft means. As will be seen from Fig. 1, the hub portion 84 of the lower gear 72 is in driving connection with the shaft section 42 and 43, whereby the feed shaft means is rotated whenever the agitator shaft means 15 is driven.

In many cases, it may be desirable to rotate the feed shaft appreciably slower than the rate provided by arrangement shown in Fig. 1. For this purpose, according to the principles of the present invention, this is provided by simply interchanging the gear 71 and 72. To effect this change, the fasteners 88 and 89 are disconnected and then one of the shaft means 15 and 16 is turned, as by hand, so as to dispose the associated shaft end sections in a position that permits the notched portions of the associated gear to be moved transversely away from the shaft means. For example, the upper or agitator shaft means may be turned to the positions shown in Fig. 2, and then the gear carrier may be swung bodily about the axis of the lower shaft means 16, the hub of the upper gear 71 being disengaged from the upper shaft sections 24 by virtue of the open or transverse notches 77 and 81 in the hub ends and also by virtue of the notch 58 in the flange 54 (Fig. 4).

To facilitate some variations in the relative positions of the shafts 18, the walls 76 and 77 are enlarged, as at 104, Fig. 2. After the carrier 50 has thus been disengaged from the upper shaft means 15, the lower shaft means 16 is then rotated so as to bring the shaft end sections 42 and 43 into a position to accommodate disconnection of the gear hub 81 therefrom, the notch 65 in the carrier 50 clearing the shaft end 42 when the parts are separated. By virtue of the carrier notches 58 and 65 lying in a circumferential position, as described above, the carrier may be first disengaged from either the upper shaft means 15 or the lower shaft means 16, as desired.

After the carrier 50 has been disengaged as described above, the gears 71 and 72 may then be lifted away from the carrier 50 and interchanged so that the smaller gear 72 is in the upper opening 51 while the larger gear 71 is in the lower opening 52. The gear carrier, with gears thus interchanged, may then be reassembled in substantially the reverse of the steps outlined above, after which the carrier 50 is reattached to the hopper ends 12 and 13 by reinserting the fasteners 88 and 89. When thus interchanged, the feed shaft is rotated at approximately one fourth the rate that it is rotated when the gears are arranged as shown in Fig. 1.

While I have shown and described above, the preferred structure in which the principles of the present invention have been incorporated, it is to be understood that my invention is not to be limited to the particular details, shown and described above, but that, in fact, widely different means may be employed in the practice of the broader aspects of my invention.

What I claim, therefore and desire to secure by Letters Patent is:

1. A variable drive mechanism for a pair of closely spaced implement units, each unit including a hopper end, first and second pairs of axially aligned shafts having their adjacent ends extending through said hopper ends into the space between the latter, a drive gear connected to drive one shaft of one of said pairs of shafts, a first gear having a detachable non-rotatable connection with the shaft ends of said one pair of shafts, and a second gear having a diameter different from the diameter of said first gear, said second gear meshing with said first gear and having a detachable non-rotatable connection with the shaft ends of the other pair of shafts.

2. A variable drive mechanism for a pair of closely spaced implement units, each unit including at least one shaft, the ends of said shafts being spaced apart but in axial alignment, said drive mechanism comprising means on the end of each shaft extending outwardly thereof into the space between said units and in axial alignment, a gear-supporting bracket means swingably supporting said bracket on one of said units for movement into and out of said space, a gear rotatably carried by said bracket, said gear having notched means at each side shaped to non-rotatably engage said shaft means and to accommodate movement of said gear and said bracket away from said shafts.

3. A variable drive mechanism for a pair of closely spaced implement units, each unit including at least one shaft, the ends of said shafts being spaced apart but in axial alignment, and a gear member removably connected with said shaft ends, said gear having a transverse notch at each side to accommodate insertion and removal of said gear from said shafts, and means establishing a driving non-rotatable connection between said gear and said shafts when said shafts are disposed in the notches of said gear.

4. In a drive mechanism including a shaft, a movable gear support shiftable into and out of a position in line with and closely adjacent an end of the shaft, a gear carried by said support and having a transverse opening accommodating movement of said gear with said support toward and away from said shaft, and means on said gear non-rotatably receiving said shaft.

5. In a drive mechanism including a shaft having a polygonal end portion, a movable gear support having a socket notched at one side to accommodate movement of said socket into alignment with said shaft and to receive the polygonal portion thereof, and a gear member carried by said support and having a hub section having a notch shaped to non-rotatably receive said polygonal shaft section, said latter notch being disposable in a position registering with the notch in said support socket to accommodate movement of the support and gear toward and away from said shaft.

6. In a drive mechanism including a shaft, a movable gear support shiftable about an axis into and out of a position in line with and closely adjacent an end of the shaft, said gear support carrying a gear-receiving socket having a notch in one edge thereof accommodating passage of a shaft end into said socket, said notch facing generally in a direction normal to a line connecting the socket with said axis, and a gear removably disposed in said socket and having a transversely notched shaft-receiving portion adapted to register with the notch in said support socket to accommodate movement of the support and gear toward and away from said shaft.

7. A variable drive mechanism for a pair of closely spaced implement units, each unit including a pair of upper and lower shafts, said shafts being parallel and each extending outwardly into the space between said units, said upper shafts of said pair of units being arranged in axial alignment and the lower shafts of said pairs of units also being in alignment, the adjacent ends of said aligned shafts being spaced apart, a relative narrow gear support removably disposable in said space and including upper and lower openings spaced so as to lie in alignment with said upper and lower shafts, and gears interchangeably disposed in said openings, each gear having shaft-receiving sections notched to provide for attachment to and detachment from said shaft when said support is attached and detached, respectively.

8. The invention set forth in claim 7, further characterized by said gears having hub sections disposed in said gear support openings and each of said hub sections being notched so as to be capable of being passed onto the associated shaft from one side thereof.

9. The invention set forth in claim 8, further characterized by means mounting said gear support on one of said implement units.

10. The invention set forth in claim 8, further characterized by driving means connected with certain of said shafts, said interchangeable gears being connected to drive the other of said shafts at a selectively variable rate from said drive means.

11. A variable drive mechanism for a pair of closely spaced implement units, each unit including a first shaft means and a second shaft means, both carried by said implement unit and each shaft means including axially aligned shafts, the inner ends of the innermost shafts of each implement unit extending into said space, the ends of the innermost shafts of one implement unit being aligned with but spaced axially from the associated innermost shafts of the other implement unit, a relative narrow gear support removably disposable in said space and including upper and lower openings spaced so as to lie in alignment with said upper and lower shafts, gears interchangeably disposed in said openings, each gear having shaft-receiving sections notched to provide for attachment to and detachment from the associated innermost shaft ends when said support is attached and detached, respectively, and said notched shaft receiving sections being disposable so that both gears, with said support, may be removed simultaneously from said space.

12. The invention set forth in claim 11, further characterized by the adjacent ends of said implement units including end members having spaced apart bearing openings, each shaft means including bushing means rotatably in the bearing opening in the associated end member, each bushing carrying a part extending into said space and serving as the inner end of the associated shaft means.

13. The invention set forth in claim 12, further characterized by said shafts being non-circular and said parts also being non-circular of like cross section.

14. The invention set forth in claim 12, further characterized by shaft-driving means connected to one of said bushing means, said gears serving to transmit the drive to other shaft means.

No references cited.